United States Patent [19]

Morawski

[11] 4,205,859
[45] Jun. 3, 1980

[54] INDEXABLE CHUCK

[76] Inventor: London T. Morawski, 15850 Common Rd., Roseville, Mich. 48066

[21] Appl. No.: 935,476

[22] Filed: Aug. 21, 1978

[51] Int. Cl.² .............................................. B23B 31/36
[52] U.S. Cl. ........................................ 279/5; 279/6
[58] Field of Search .............................. 279/6, 5, 110

[56] References Cited

U.S. PATENT DOCUMENTS

| | | | |
|---|---|---|---|
| 2,517,908 | 8/1950 | Miller | 279/6 |
| 3,680,876 | 8/1972 | Okada | 279/5 |
| 3,685,845 | 8/1972 | Fischer et al. | 279/6 X |
| 3,881,735 | 5/1975 | Joyce | 279/5 |

FOREIGN PATENT DOCUMENTS 846256  8/1960  United Kingdom .................... 279/1 D

*Primary Examiner*—William R. Briggs
*Attorney, Agent, or Firm*—Barnes, Kisselle, Raisch & Choate

[57] ABSTRACT

A workpiece chuck assembly has a head adapted to be fixedly connected to the rotary driven spindle of a machine tool and a chuck member journalled in said head for rotary indexable movement about an axis radially offset from the rotary axis of the head.

10 Claims, 4 Drawing Figures

INDEXABLE CHUCK

This invention relates to a chuck for gripping a workpiece, and, more specifically, to an eccentrically indexable chuck.

Many types of workpieces are by necessity designed with a plurality of holes, protuberances, or other sections which are spaced concentrically around and radially offset from the central axis of the workpiece. For example, a flanged hub may have a series of circumferentially spaced bolt holes on the flange spaced concentrically around the central axis of the hub. The radially offset holes cannot be machined by mounting the hub coaxially in a conventional rotary-driven chuck which is indexable about the axis of the machine spindle on which the chuck is mounted. To machine such offset holes either the workpiece must be mounted in a rotary chuck with the axis of each offset hole being machined aligned with the rotary axis of the chuck or a rotary-driven cutting tool must be arranged in a position radially offset from the central axis of the workpiece mounted on a fixed work support. As a practical matter, it is more desirable to rotate the chuck rather than the cutting tool. However, it is not practical to provide a chuck for gripping a workpiece in a position offset from the workpiece axis and then successively reposition the workpiece in the chuck to machine each offset hole.

The primary object of this invention is to provide a chuck assembly which enables the machining of such radially offset sections of a workpiece in an efficient manner.

Another object of the invention is to provide a work-gripping chuck mounted eccentrically on the rotary spindle of a machine tool and rotatably indexable about an axis offset from the rotary axis of the spindle so that the successive radially offset sections of the workpiece can be presented to a cutting tool aligned with the axis of the rotating spindle.

More specifically, the chuck assembly of the present invention includes a head adapted to be rigidly mounted on the spindle of a machine tool to rotate therewith and a work-gripping chuck journalled on the head for rotary indexing about an axis offset radially from the rotary axis of the head. This arrangement enables the chuck to be incrementally indexed in a rotary manner to a desired position and then locked against rotation relative to the head so that the axis about which the workpiece is rotated while being machined is aligned with the rotary axis of the spindle and radially offset from the central axis of the workpiece. Thus, by indexing the chuck incrementally successive machining operations can be performed on the workpiece at circumferentially successive locations spaced concentrically around the axis of the workpiece. The mechanism for indexing the work-gripping chuck preferably comprises a reciprocable drawbar within the machine spindle which rotates the chuck through a predetermined arcuate extent during each reciprocating stroke of the drawbar.

Other objects, features and advantages of the present invention will become apparent from the following description and accompanying drawings, in which.

Figure 1:
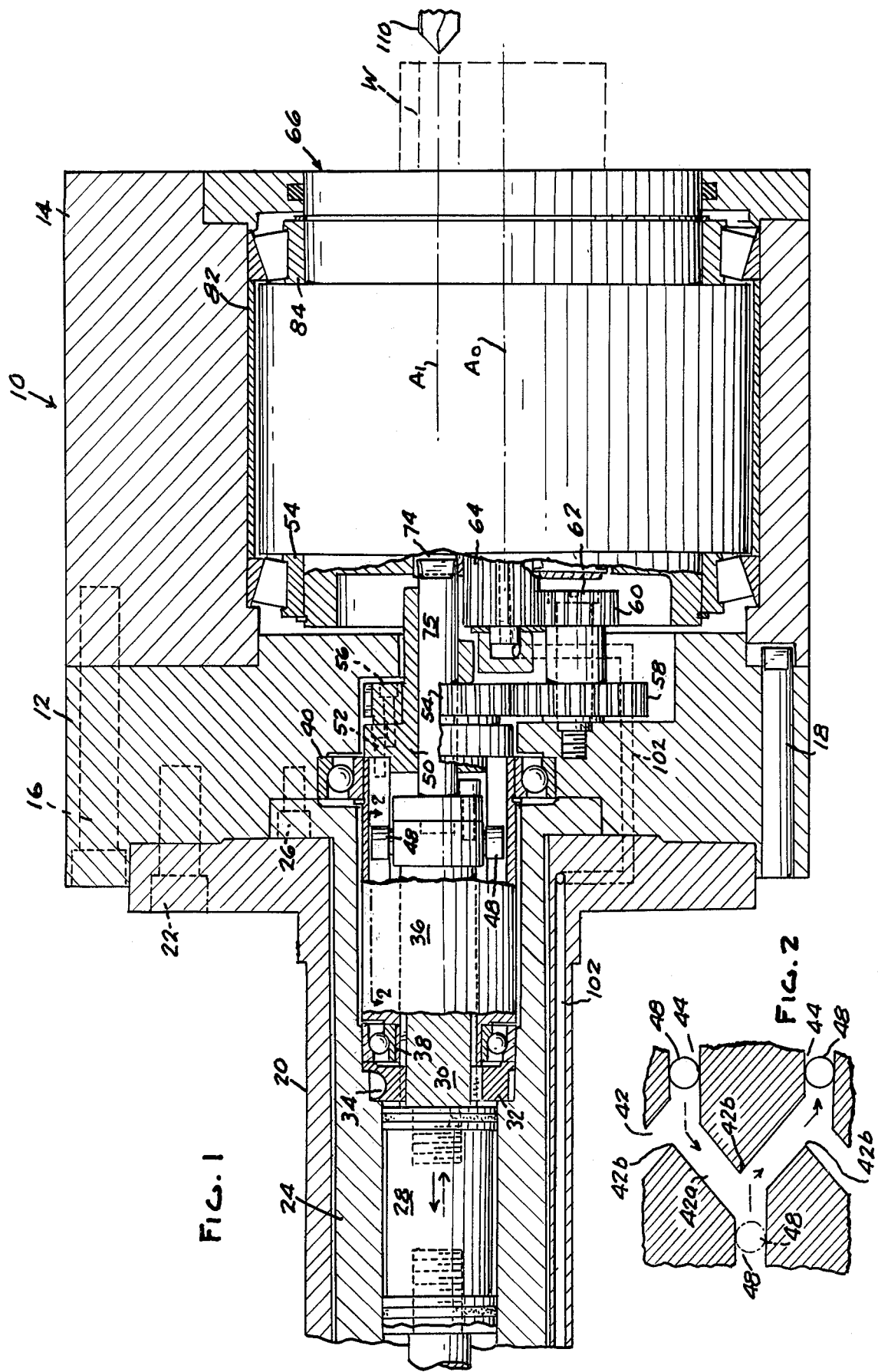
FIG. 1 is a longitudinal sectional view of a chuck assembly according to the present invention.
Figure 2:
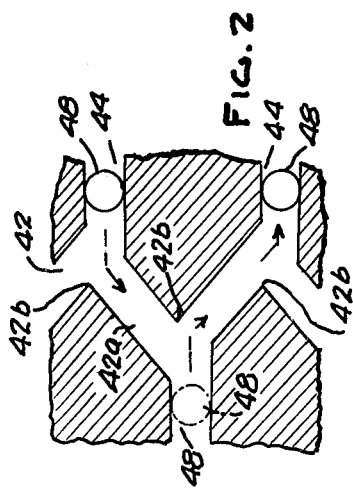
FIG. 2 is a fragmentary sectional view along the line 2—2 of FIG. 1.

The chuck assembly of this invention comprises a head 10 which includes a main support plate 12 and a housing 14 which are secured together by screws 16 and held in alignment by one or more keys 18. Head 10 is adapted to be secured to the rotary driven spindle 20 of a machine tool by screws 22. Within the hollow machine spindle 20 there is arranged a spindle adapter sleeve 24 fixedly secured to support plate 12 by screws 26. Spindle 20 and sleeve 24 are rotated in unison by any suitable means on the machine tool. Within sleeve 24 there is arranged for axial sliding movement a drawbar 28. Drawbar 28 is adapted to be reciprocated axially by any suitable means. A shaft 30 connected to the forward end of drawbar 28 is rotatably locked to the spindle by a splined connection with a bushing 32 keyed to sleeve 24 as at 34. Shaft 30 extends axially through a barrel cam 36 journalled at one end by a bearing 38 within sleeve 24 and journalled at its opposite end in support plate 12 by a bearing 40. Bearings 38,40 retain barrel cam 36 in an axially fixed position within sleeve 24. The inner periphery of cam 36 has four sets of angular, intersecting, zig-zag cam tracks 42,42a and four sets of axially extending cam tracks 44,46. Cam tracks 44 extend forwardly from the intersections between cam tracks 42,42a at one end thereof and cam tracks 46 extend rearwardly from the intersections between cam tracks 42,42a at the other end thereof. It will be observed that the intersection points 42b of cam tracks 42,42a are slightly offset circumferentially in one direction from the respective axially extending cam tracks 44,46. The forward end of shaft 30 supports four cam follower rollers 48 which are spaced apart equally around the shaft and which engage the cam tracks in barrel cam 36. The cam track arrangement is such that, when shaft 30 is displaced axially rearwardly from its forwardly advanced position shown in FIG. 1, the cam followers 48 are displaced along cam tracks 44 into engagement with cam tracks 42a and then into cam tracks 46 to rotate barrel cam 36 one-eighth of a revolution in one direction. When drawbar 28 is shifted forwardly from its retracted position, the cam followers 48 are displaced forwardly along cam tracks 46,42,44 to rotate the barrel cam one-eighth of a revolution in the same direction. Thus, for each complete reciprocating stroke of drawbar 28 barrel cam 36 is rotated through one-quarter of a revolution.

Figure 3:
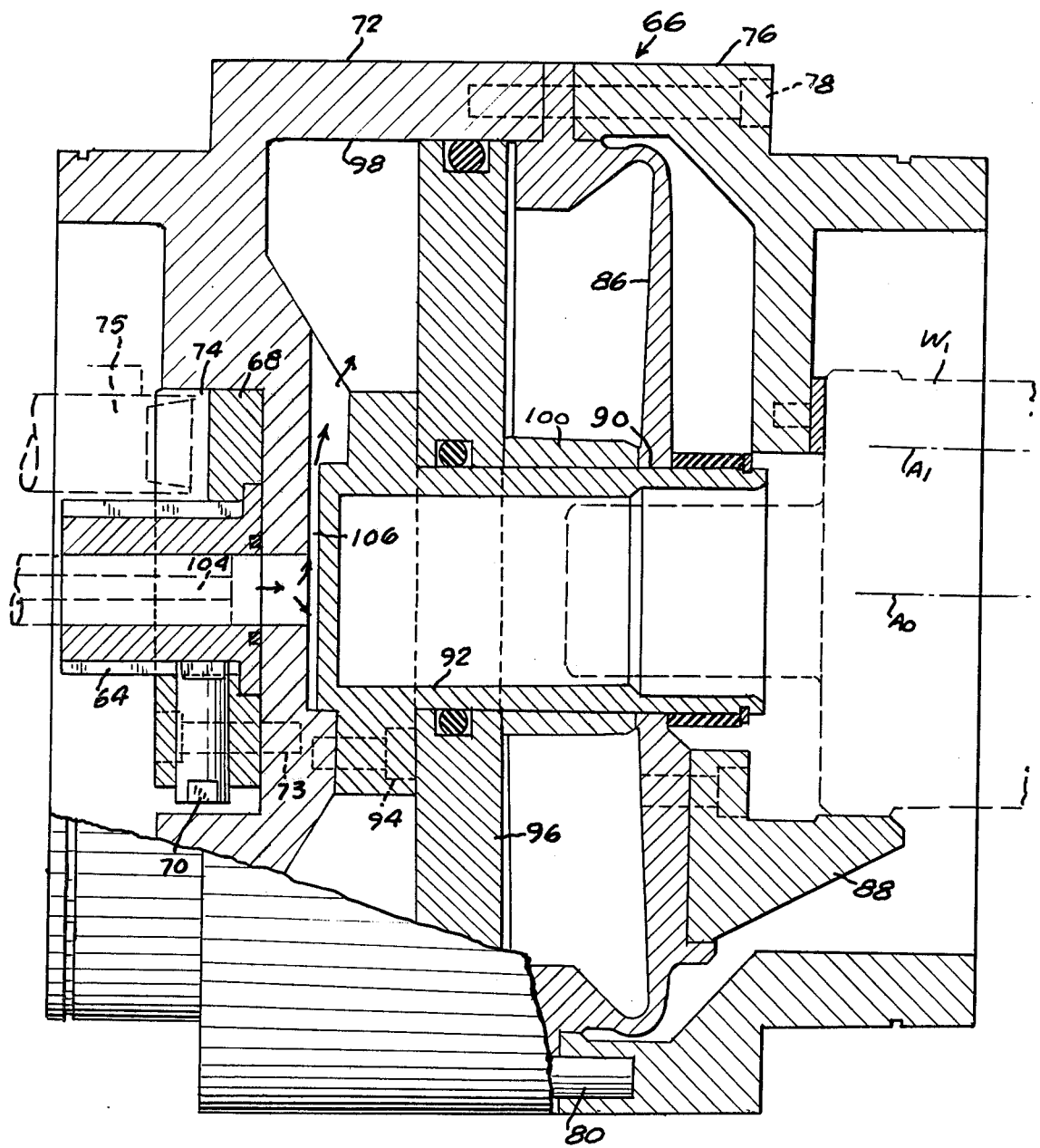
FIG. 3 is a side elevational view of the work-gripping chuck of the assembly with parts broken away to show the construction thereof.

A flanged sleeve 50 is secured as by screws 52 to the forward end of barrel cam 36 for rotation therewith. A gear 54 secured to sleeve 50 by screws 56 meshes with a gear 58 of the same diameter. Gear 58 and a third gear 60 form a connected gear set journalled on support plate 12 by a screw 62. Gear 60 in turn meshes with a fourth gear 64 of the same diameter which is mounted on the body of a diaphragm chuck 66 by a ring 68 to which the gear is keyed by a pin 70 (FIG. 3). Ring 68 is secured to the rear plate 72 of the chuck by a screw 73. Ring 68 is formed with four index slots 74 which are adapted to successively register axially with the forward end of a shot pin 75 when the chuck is indexed. Shot pin 75 extends coaxially from the forward end of shaft 30 and reciprocates therewith.

The body of chuck 66 includes a front plate 76 mounted on the rear plate 72 by screws 78 and one or more keys 80. Chuck 66 is journalled within a cylindrical recess 82 of housing 14 by bearings 84. The central axis $A_0$ of chuck 66 and recess 82 is radially offset from the central axis $A_1$ of head 10. Gear 64 is coaxially aligned with chuck 66 so that when gear 64 is rotated by the axial reciprocation of drawbar 28 chuck 66 is rotatably indexed one-quarter of a revolution.

Chuck 66 may be of any conventional type, but is preferably a generally conventional diaphragm chuck which includes a resiliently flexible metal diaphragm member 86, the outer periphery of which is clamped between the front and rear plates 76,72, respectively, of the chuck. The diaphragm member 86 has a plurality of jaws 88 mounted thereon which operate to clamp and release a workpiece W in response to flexing of the diaphragm. In the chuck illustrated the diaphragm member 86 is formed with a central axis opening 90 through which a sleeve 92 extends. Sleeve 92 is closed at its inner end and secured to rear plate 72 by screws 94. A piston 96 is slideably arranged on the outer periphery of sleeve 92, the outer periphery of piston 96 slideably engaging the bore 98 of rear plate 72. A spacer 100 extends between the front face of piston 96 and the rear face of diaphragm 86. Thus, when piston 96 is displaced forwardly on sleeve 92 spacer 100 flexes the diaphragm so as to pivot the jaws 88 in a radially outwardly direction to release the workpiece W. In the arrangement illustrated piston 96 is displaced by means of compressed air. The air is directed to the rear side of piston 96 through a passageway 102 in spindle 20 and head 10 which connects with a central passageway 104 through gear 64. Passageway 104 connects with radially extending passageways in the end wall of sleeve 92 which communicate at their radially outer ends with the chamber defined by the bore 98 in the rear plate 72.

Figure 4:
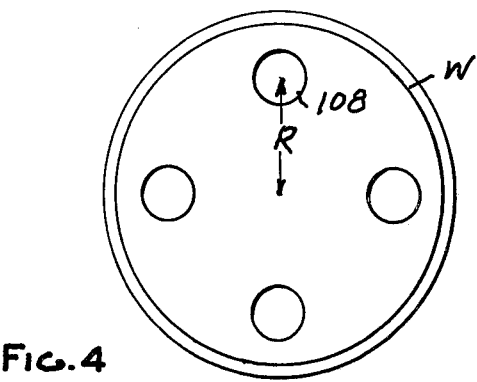
FIG. 4 is an end view of a typical workpiece adapted to be gripped by the chuck for machining.

For purposes of illustration there is shown in FIG. 4 a workpiece of the type adapted to be mounted in the chuck 66 for machining purposes. In the workpiece illustrated it is required to drill four holes which are concentrically spaced around the central axis of the workpiece. The holes 108 lie on a circle, the radius R of which corresponds to the radial distance between the axes $A_0$ and $A_1$. In the arrangement illustrated these holes are machined by a drill 110 which is aligned coaxially with the axis $A_1$ about which the head 10 is rotated.

To machine the holes 108 the workpiece W is mounted in the chuck in the manner illustrated in FIG. 3. When the machine spindle is rotated and the drill 110 is advanced into the workpiece one of the holes 108 is machined. Upon completion of the first hole, drill 110 is retracted and drawbar 28 is retracted and then advanced so as to rotate chuck 66 through one-quarter of a revolution in the manner previously described. When the drawbar is toward its forwardmost position the cam followers 48 engage the axially extending cam tracks 44 and the forward end of shot pin 75 engages the next successive index slot 74 in ring 68. Thus, the chuck is again locked against rotation relative to heat 10. Thereafter, when the spindle is rotated and the drill 110 is advanced into the workpiece, the next hole 108 is drilled.

It will be appreciated that the extent of angular index of chuck 66 can be varied by the design of the cam tracks in barrel cam 36 to accommodate for the specific workpiece to be machined. Thus, if the workpiece requires machining at three—rather than at four—sections spaced concentrically around its axis, the cam slots in barrel cam 36 would be designed to rotate the chuck through one-third of a revolution when the drawbar 28 is actuated through a complete reciprocating stroke. It will also be appreciated that suitable gearing may be designed to interconnect barrel cam 36 with chuck 66 such that the extent of rotation of chuck 66 is proportional, but not necessarily equal, to the extent of rotation of barrel cam 36.

I claim:

1. A workpiece chuck assembly comprising a head adapted to be fixedly mounted on the rotary driven spindle of a machine tool to rotate about the rotary axis of the spindle, a workpiece chuck mounted on said head to rotate about an axis offset radially from the rotary axis of the head, means for rotatably indexing said chuck about its rotary axis on the head through successive arcuate increments, said indexing means including an axially reciprocable drawbar coaxial with said head and means operated by reciprocation of said drawbar for rotating the chuck on said head, and means for locking the chuck against rotation relative to said head whereby a workpiece engaged by said chuck is adapted to be machined at selected sections thereof spaced concentrically about the rotary axis of the chuck by means of a cutting tool aligned axially with the rotary axis of the head by rotating the head about its central axis with the chuck locked thereon during each machining operation and by rotatably indexing the chuck about its axis between successive machining operations.

2. The combination set forth in claim 1 wherein the means operated by the drawbar includes a first gear coaxial with said head and adapted to be rotated when the drawbar is reciprocated, a second gear coaxial with said chuck for rotating the chuck and gear means interconnecting said two gears.

3. The combination set forth in claim 1 wherein said means for locking the chuck relative to said head comprises an abutment connected with said drawbar and a plurality of sockets in said chuck adapted to be engaged by said abutment, said sockets being spaced concentrically around the rotary axis of the chuck.

4. The combination set forth in claim 1 wherein the means for rotatably indexing said chuck on said head includes a barrel cam journalled for rotation in said head about the axis of said head, means interconnecting said cam and chuck for rotating the chuck about its axis in response to rotation of said cam and a cam follower on said drawbar engaging said cam and adapted to rotate the cam in one direction in response to axial reciprocation of the drawbar.

5. The combination set forth in claim 4 wherein said means interconnecting said cam and chuck includes a first gear fixedly connected to said cam and a second gear operatively connected to said first gear and fixed coaxially to said chuck.

6. The combination set forth in claim 4 wherein the barrel cam comprises a cylindrical sleeve having a cam track around its inner periphery.

7. The combination set forth in claim 4 wherein said barrel cam has a cam track thereon having an axially inclined portion and an axially straight portion at one end of the axially inclined portion, said drawbar having shot pin means thereon and said chuck having a plurality of sockets therein spaced concentrically around the rotary axis thereof, said shot pin means being adapted to be projected into one of said sockets when the cam follower engages the axially straight portion of the cam track.

8. The combination set forth in claim 4 wherein the chuck includes fluid-operated workpiece gripping means and including a fluid passageway in said head communicating with said fluid-operated means at the axis of the chuck.

9. The combination set forth in claim 8 wherein the means for indexing the chuck includes a gear fixed to the chuck at the axis thereof, said passageway extending axially through said gear.

10. The combination set forth in claim 4 wherein the means for indexing the chuck includes a gear fixed coaxially on said barrel cam and the means for locking the chuck against rotation relative to the head comprises a shot pin fixed to said drawbar and extending coaxially through said gear, and socket means spaced concentrically around the axis of said chuck with which said shot pin is engageable.

* * * * *